United States Patent [19]

Oglevee et al.

[11] Patent Number: 4,856,227

[45] Date of Patent: Aug. 15, 1989

[54] PLANT ORIENTED CONTROL SYSTEM BASED UPON VAPOR PRESSURE DEFICIT DATA

[75] Inventors: James R. Oglevee; Kirk A. Oglevee, both of Connellsville, Pa.

[73] Assignee: OCS, Inc., Connellsville, Pa.

[21] Appl. No.: 156,418

[22] Filed: Feb. 16, 1988

Related U.S. Application Data

[63] Continuation-in-part of Ser. No. 919,702, Oct. 16, 1986.

[51] Int. Cl.$^4$ ............................ B01F 3/02; A01G 9/00
[52] U.S. Cl. .......................................... 47/17; 47/48.5;
236/44 C; 165/21
[58] Field of Search ...................... 47/17, 48.5, 79, 58,
47/14; 364/420; 236/44 C; 165/21

[56] References Cited

U.S. PATENT DOCUMENTS

| | | | |
|---|---|---|---|
| 4,164,868 | 8/1979 | Suntola | 73/336.5 |
| 4,211,037 | 7/1980 | Green | 47/62 |
| 4,430,828 | 2/1984 | Oglevee et al. | 47/17 |
| 4,755,942 | 7/1988 | Gardner et al. | 364/420 |

OTHER PUBLICATIONS

"Effect of Different Irrigation Methods and Levels on Greenhouse Muskmellon" by A. Borelli et al., Acta Horticulturea 58/1977, pp. 129–135.

"Scheduling Irrigations with Computers" by Marvin E. Jensen, Journal of Soil and Water Conservation, pp. 193–195.

"Mist Controller Plus"—Oglevee Computer Systems Operations Manual.

"The Process of Transpiration" by Paul J. Kramer, Water Relations of Plants, Academic Press 1983, pp. 294–297.

Primary Examiner—Robert A. Hafer
Assistant Examiner—Jeffrey L. Thompson
Attorney, Agent, or Firm—Webb, Burden, Ziesenheim & Webb

[57] ABSTRACT

A system for controlling environmental conditions including irrigation or misting in greenhouses having a plurality of crop beds within one greenhouse enclosure. Aspirated enclosures have associated temperature sensors for measuring dry bulb temperature and humidity, the temperature of a surface over the bed and also a sensor of incident light over the bed. A computer is programmed with a task for inputting temperature data and for calculating the vapor pressure deficit over each bed and for inputting incident light data for measuring a parameter indicative of physiological crop age. A task establishes times for supply of water based upon the gathered data.

15 Claims, 3 Drawing Sheets

PLANT ORIENTED CONTROL SYSTEM BASED UPON VAPOR PRESSURE DEFICIT DATA

RELATED APPLICATIONS

This application is a continuation-in-part of our application Ser. No. 919,702, filed Oct. 16, 1986. It relates in part to our U.S. Pat. No. 4,430,828, issued Feb. 14, 1984.

FIELD OF THE INVENTION

This invention pertains to a plant oriented system for controlling environmental conditions in greenhouses.

BACKGROUND OF THE INVENTION

Automatic closed-loop control of temperature in a greenhouse by regulating heating and ventilation is old in the art. In fact, other factors affecting the growth and health of the crops being grown in the greenhouse have been automatically controlled. However, in the past control has been directed to maintaining the overall greenhouse environment based upon a small number of sensors and traditional control devices such as single thermostats. Thus prior greenhouse control systems have not been plant or crop oriented control systems. They have not addressed the problems of controlling growth and plant health conditions directly at the growing bed or plant level. Unfortunately, the control of the overall greenhouse conditions, while providing adequate plant growth and health conditions at one bed, may not provide the proper conditions at another bed. This may be due to the nonuniformity of a condition, say temperature, throughout the greenhouse or the fact that different beds are planted with different crops or even that different beds planted with the same crop are at different stages in the growing cycle. Prior greenhouse control systems have not provided adequate individualized control of bed areas based upon feedback of temperature, light, and humidity conditions directly over the beds.

Irrigation and/or misting are the application of moisture to the crop or the soil. Irrigation and/or misting of greenhouse crops based upon estimated evapotranspiration has been proposed but the approach has been crudely implemented and/or not crop oriented. See, for example, "Mist Control Plus" Operations Manual, Oglevee Computer Systems, "Effects of Different Irrigation Methods and Levels on Greenhouse Musk Melon" *ACTA HORTICULTURAE* 58 (1977) and "Scheduling Irrigations with Computers" *Journal of Soil and Water Conservation,* September-October 1969. It has been known in a theoretical way that evapotranspiration is related to vapor pressure across the plant leaf surfaces and certain resistances. See *Water Relations of Plants* by Paul J. Kramer (Academic Press 1983) pp. 294-297. However, applicants are unaware of any attempt to control irrigation or misting in a greenhouse environment by simply accumulating vapor pressure deficit.

SUMMARY OF THE INVENTION

It is an object of this invention to provide a computerized plant oriented control system and method that, as a function of accumulated vapor pressure deficit over the beds, provides the amount of irrigation necessary to insure healthful propagation and growth of the crop. Vapor pressure deficit is the difference between the measured vapor pressure and the vapor pressure of water at the temperature of the atmosphere or, preferably, a surface over the bed having a temperature representative of leaf temperature. Accumulated vapor pressure deficit is an approximate integration of vapor pressure over time.

It is an object of this invention to provide a computerized plant oriented control system and method for misting or irrigating greenhouse plants wherein the times of moisture application are related to the accumulated vapor pressure deficit.

It is an object of this invention to provide a computerized plant oriented control system and method for misting or irrigating greenhouse plants wherein the times of moisture application are related to the accumulated vapor pressure deficit and a measure of the physiological age of the crop.

It is an object of this invention to provide a computerized plant oriented control system and method for control of the greenhouse environment including control of irrigation or misting rate and, for example, closed-loop control of temperature, light, and/or carbon dioxide concentration.

It is another object of this invention to provide an automated plant oriented control system and method for programming growth rates by maintaining the irrigation rate and one or more conditions such as temperature and carbon dioxide concentration in the atmosphere over the beds as a function of the available light and/or controlled amount of light incident the crop bed.

It is a feature according to this invention that a greenhouse has a plurality of sensing zones and a plurality of irrigation (or misting) control zones and wherein each sensing zone is provide individualized environmental control based upon its particular needs. The system includes components that collect data such as temperature, light, humidity, wind speed and direction. A digital computer uses the data obtained to make decisions and act upon them. The computer is programmed with one or more algorithms to make the decisions. The algorithms may be modified depending upon the nature of the crop and the greenhouse system being controlled. The plant oriented control system provides a fully automated greenhouse environment with the ability to monitor and control all applicable conditions.

Briefly, according to this invention, there is provided a plant oriented method for automatically applying water to a crop bed in a greenhouse. The method comprises continuously at spaced intervals gathering temperature data for estimating the vapor pressure of crop leaf water and continuously at spaced intervals gathering data for estimating the moisture content of the atmosphere directly above the bed. Continuously the vapor pressure deficit is calculated from the data gathered in the previous steps and vapor pressure deficit data is accumulated (time integrated). A factor indicative of leaf area is established and a vapor pressure deficit accumulation threshold is established based upon the factor. When the accumulated vapor pressure deficit reaches the threshold, water is supplied to the crop bed. Preferably, the threshold is automatically adjusted based upon a time parameter indicative of physiological crop age.

Briefly, according to this invention, a computerized plant oriented control system comprises structure defining a plurality of sensing zones, structure defining a plurality of irrigation (or misting) control zones and a computer programmed with algorithms or tasks for maintaining irrigation (or misting) rate based upon accumulated vapor pressure data. Preferably, at least one other parameter affecting growth is detected and controlled. For those embodiments which relate to anticipatory control of conditions, sensors remote from the bed such as external temperature, wind speed and wind direction sensors are required. The computer must include a real time clock.

As the terms are used herein, a "sense zone" or "sensing zone" is a bed area, preferably not in excess of about 3,000 square feet all planted with the same crop at about the same time having an aspirated wet bulb/dry bulb humidity sensor directly over and near the bed. As used herein, various "control zones" include a misting control zone or irrigating control zone and, possibly, a heating control zone, cooling control zone, shade control zone, heat retention control zone, horizontal flow control zone, and carbon dioxide atmosphere control zone. Each control zone has associated with it a controllable device for affecting the environment within the zone. A misting control zone comprises a bed area, usually one sensing zone, having controllable water spray over the bed. An irrigating control zone comprises a bed area, usually one sensing zone, having a controllable bed watering system. A heating control zone comprises a bed area, including at least one sensing zone, that has a controllable heating element associated therewith. A cooling control zone comprises a bed area, including at least one sensing zone, that has a controllable cooling system associated therewith. This may simply be a cross ventilation pathway controlled by one or more vents. A shade control zone comprises a bed area, including at least one sensing zone having a controllable sunscreen or shade associated therewith. The shade control zone might become a heat retention zone at night as radiative cooling can be controlled by the presence or not of the screen or shade over the bed. A horizontal flow control zone is a bed area, including at least one sensing zone, that has a controllable horizontal circulation fan associated therewith to prevent stratification when no ventilation is being used. A carbon dioxide atmosphere control zone comprises a bed area, generally the entire enclosed greenhouse, having means for generating carbon dioxide. It should be noted that the various control zones need not be contiguous but very often are overlapping. (For example, a large greenhouse may have two cooling zones but many heating zones.) Controllable devices associated with the control zones are devices which may be activated, for example, by application of an AC current such as a solenoid control valve or an AC motor controlled by a motor controller which controller provides the function of starting, stopping, and reversing a motor.

As stated above, the computer must be programmed with algorithms or tasks to enable it to make intelligent decisions. According to this invention, there is provided an algorithm for establishing irrigation times based upon accumulated vapor pressure deficit and preferably a measure of physiological crop age.

An algorithm or task, at spaced intervals, inputs digital data for each bed or sense zone. The vapor pressure deficit is calculated from the data. The deficit is accumulated until it reaches a threshold, which is preestablished and which may be adjusted as a function of a time measure of the physiological age of the crop. Output control signals actuate controllable devices and thus the crop is irrigated (or misted) to prevent moisture deficiencies. This will be recognized as a semi-open-loop control.

The control is referred to as a semi-open-loop since it is neither a completely closed-loop nor a completely open-loop control scheme. The parameter that applicants seek to control is the amount of moisture in the crop bed and/or over the crop surface. Since moisture is constantly being removed by evapotranspiration at a rate that varies due to a number of conditions, the rate of application of water to the crop or crop bed (misting or irrigation) should equal the evapotranspiration rate. Applicants have found that while a number of factors are known to affect the evapotranspiration rate, only two need be considered; namely, vapor pressure deficit and physiological crop age (as a measure of leaf area). Since moisture entering the space above the crop will reduce the vapor pressure deficit, the vapor pressure (the measured variable) will be to some degree related to the amount of moisture in the bed and entering the space over the bed. On the other hand, the vapor pressure deficit may be only slightly affected by the moisture entering the space over the bed, when in the winter, moisture is rapidly condensing on greenhouse walls or in summer a strong ventilating breeze from the outside is across the crop bed.

In addition, at least one other parameter affecting growth is preferably provided with a closed-loop control. For example, the average temperature is then compared to a set point, for example, a maximum temperature, a minimum temperature or the dew point. Depending upon the relationship of the average temperature sensed and the set point, the computer will output control signals to adjust the controllable devices such as heating or ventilating equipment to adjust the temperature relative to the set point temperature. Additionally, an algorithm may maintain the temperature and carbon dioxide atmosphere as a function of the available light to provide a desired growth rate and/or to make efficient use of energy.

BRIEF DESCRIPTION OF THE DRAWINGS

Further features and other objects and advantages of this invention will become clear from the following detailed description made with reference to the drawings in which.

DETAILED DESCRIPTION

For a more complete description of the more general aspects of this invention, we incorporate our U.S. Pat. No. 4,430,828 by reference.

The equipment for the plant oriented control system according to this invention can be considered in three groups based upon their functions. First there are the sensors. These collect greenhouse data such as temperature, humidity, light, and such external conditions as temperature, light, humidity, wind speed and direction. A second group comprises the computer with associated input and output boards. A third group comprises the valves and motors necessary to carry out the actions that bring about a change in the greenhouse environment.

The grower must determine the number of "control zones" he intends to include in his greenhouse. A zone is defined as one part of the total greenhouse of which individual, independent control can be maintained. The type and location of existing equipment within a greenhouse determine the establishment of control zones. Sensing zones and control zones have already been described. Heating and cooling zones need not be related so it is not necessary that they each have the same division. For example, as a practical matter, an acre of greenhouse may have sixteen heating zones but only two cooling zones.

The crops in the adjacent sense zones within the same control zone theoretically might require a controlled condition to be different. However, due to the nature of crop requirements and the usual greenhouse control configurations, this is seldom the case. With some planning of crop placement, the problem can be avoided. For example, most sense zones are coincident with a control zone for heating (for example, hot pipes); misting or irrigating. These are conditions that may vary from crop to crop. On the other hand, ventilation zones usually span a number of sense zones. The ventilation requirement is generally about the same for all crops.

Figure 1:
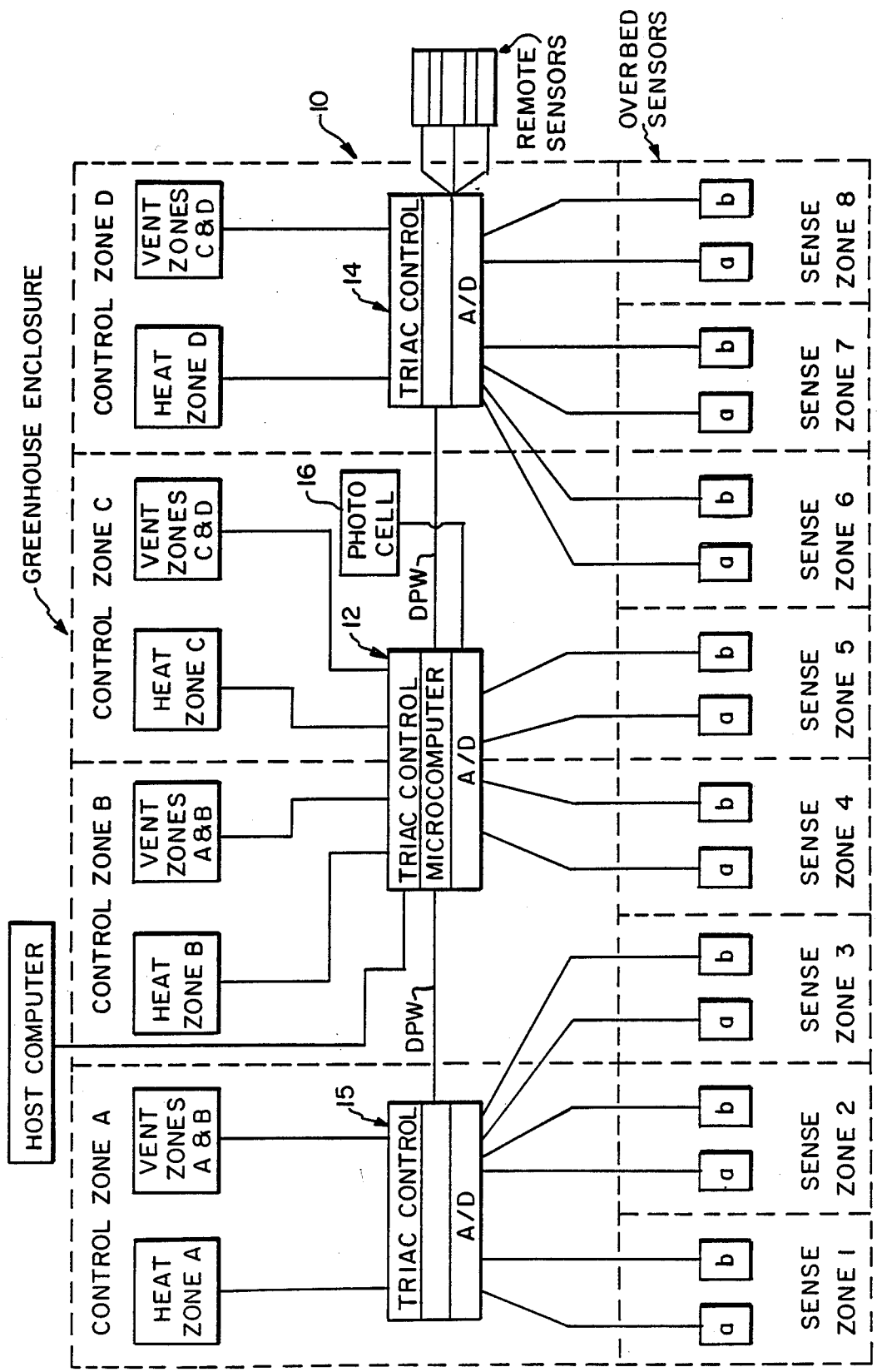
FIG. 1 is a schematic illustrating a greenhouse, sensing zones and control zones according to this invention.

Referring now to FIG. 1, the system hardware according to this invention is shown schematically. The large rectangle represents the greenhouse enclosure 10. A computer 12 having associated A/D input sections and AC output (control) sections may, for example, be located within the greenhouse. Two IO stations 14 and 15 are spaced from the computer. The IO stations have associated A/D input sections and AC output sections identical with those directly associated with the computer and, as will be explained, they are functionally equivalent to those directly associated with the computer. It is likely that IO stations will be unnecessary in a small greenhouse. In fact, for the number of sense zones illustrated in FIG. 1, the A/D input systems and AC output sections directly housed within the computer would be sufficient. The use of IO stations depends upon the number of sense zones being monitored and the spacing thereof. It is desirable to reduce the length of the sense input wires carrying analog signals and thus the additional IO stations may be required.

The greenhouse of FIG. 1 is divided into eight sensing zones, each having one or two sense stations a, b, over the bed. Sense stations are aspirated enclosures for housing both dry bulb and wet bulb temperature sensors and for generating an analog signal indicative of these temperatures. A light sensing station for generating an analog signal indicative of light intensity over the bed is often associated with the temperature sensing station. Preferably, a temperature sensor for measuring at a dark surface that is not in the flow path of air passing through the aspirated housing is also provided.

Referring again to FIG. 1, the greenhouse is further divided into a number of control zones. For example, four zones labeled A, B, C, and D have individually controlled heating and/or watering means. The heating means may comprise a number of possible devices, for example, on-off steam heating below the beds, proportional hot-water heating below the beds, infrared heaters above the beds or gas-fired unit heaters above the beds. The watering means may comprise pipes that spray a mist over the bed or pipes that deliver water to the beds.

To illustrate that the control zones may overlap, two ventilation control zones are illustrated; one extending to heating control zones A and B and the other to heating control zones C and D. Ventilation may be by opening vents on each side of the greenhouse or by turning on fans that draw air across the ventilation zone. The intake vents may or may not have evaporation coolers associated therewith depending upon the application. Shade zones comprising canvas shades that are drawn horizontally over the beds just below the rafters may be arranged in zones. In the example of FIG. 1, there are two shade zones comprising control zones A and B and control zones C and D. The shades are useful for two purposes: In the daytime, the drawn shades reduce sunlight and temperature of the beds. At night the shades help to maintain temperature over the beds by reducing radiation cooling. Located above the shade is a light sensor 16 enabling the detection of the availability of sunlight when the shade is drawn.

To this point, all of the elements of the system being described are positioned within the greenhouse enclosure. Two groups of optional elements may be positioned external to the greenhouse. An external temperature sensor, wind speed sensor, and wind direction sensor may be provided for anticipatory control as will be explained herein. Also a host computer for downloading new control algorithms or tasks to the computer may be positioned external to the greenhouse.

Plant oriented control systems must gain an adequate amount of information from each zone to be able to make the proper decisions for the correct levels of control. The overbed sensors may be housed within aspirated fan boxes and on an outer surface of the fan boxes. Temperature sensors within the fan box provide atmospheric wet bulb and dry bulb temperatures. The wet bulb temperature sensor may be eliminated by use of a capacitive humidity transducer such as described in U.S. Pat. No. 4,164,868. A temperature sensor on the outer surface of the fan box is placed to measure a temperature representative of leaf temperature. The temperature sensors comprise solid-state temperature monitoring devices having a range 0° C. to 120° C. The data described provides the ability to calculate the vapor pressure deficit.

A light sensor may be mounted close to the roof away from shadows. The light energy sensor measures light intensity in foot candles. Two types of sensors are used. The first provides very precise measurement of light in the range of 0 to 800 foot candles for use with artificial day length control. The second is a general daylight sensor that provides less resolution in a much wider photosynthetic range of 0 to 11,000 foot candles; that is, the range at which actual plant growth occurs. Typically the temperature sensors comprise a heat sensitive diode, say, LM335 with associated calibration potentiometers. They are commercially available calibrated for a 0.32 volt output in ice water and a 10 millivolt per degree Kelvin sensitivity.

To provide more efficient control, conditions outside of the greenhouse are also monitored. This enables the plant oriented control system to anticipate the greenhouse needs prior to any internal changes and also aids in conserving energy. A ten-mile per hour wind speed increase increases the heating load approximately fifteen percent.

The computer comprises a microprocessor, RAM (scratch) memory, ROM (program) memory, a 25-place keypad input and an 80 character display, for example. The computer is enclosed within an air-tight cabinet; preferably protected from both direct sunlight and other temperature extremes. Computers are available at rated operating temperatures between 0° and 70° C. (32° and 158° F.). Operational greenhouses have an internal temperature well within this range.

The sense sections of the computer, whether in the same cabinet or in an IO cabinet spaced therefrom, collects analog data from the above mentioned sensory elements and converts it to a digital signal with an analog to digital signal converter.

Figure 2:
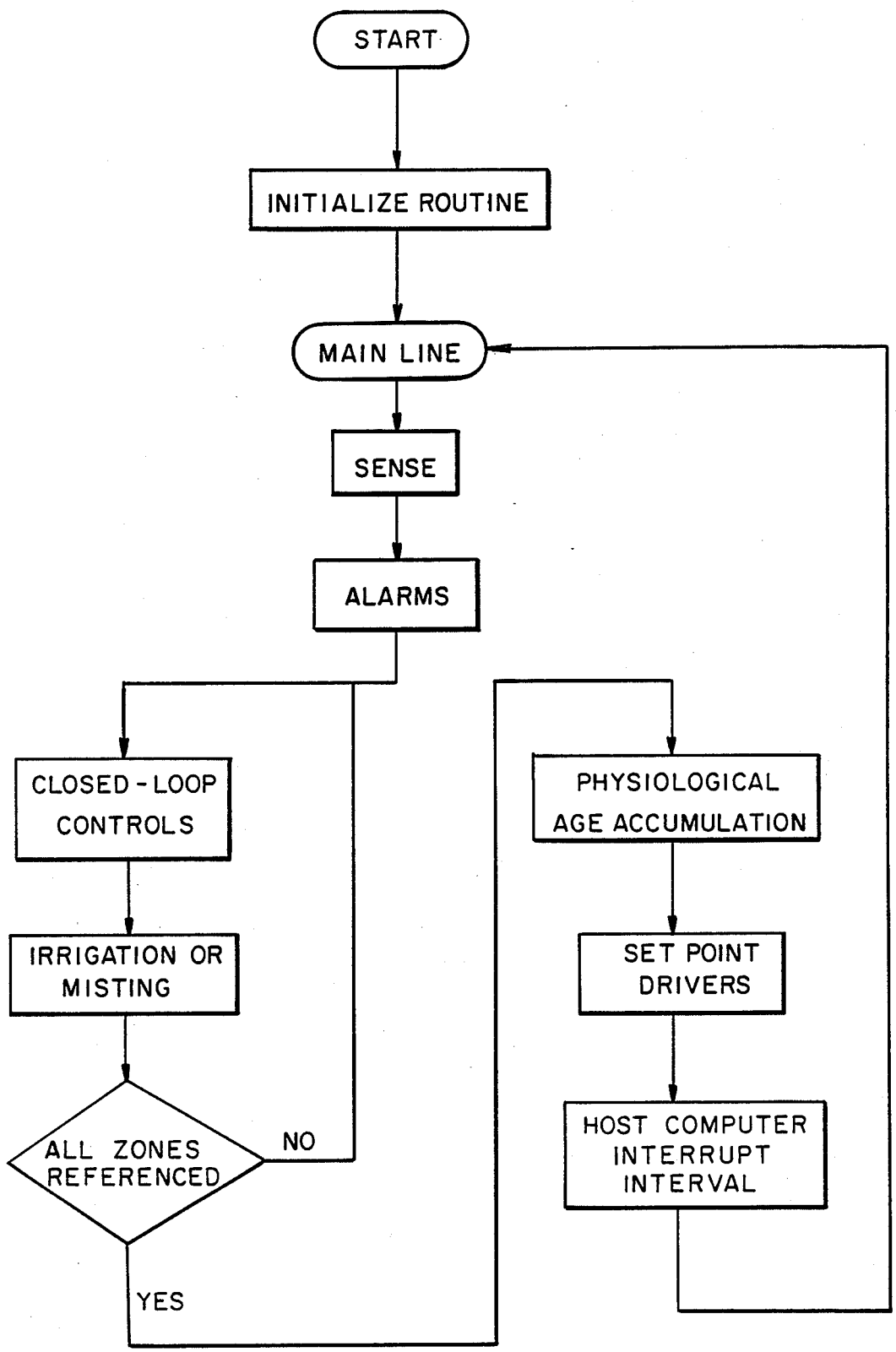
FIG. 2 is a flow chart for a main program useful according to this invention.

Referring now to FIG. 2, a flow chart for the main program is set forth. The program passes sequentially from an initialization routine through a data gathering procedure and through closed-loop control procedures such as temperature control that are repeated for each control zone and thence through a plurality of procedures that are not necessarily zone specific.

After the initialization (programming of ports and clearing of memory areas, etc.) which only takes place upon start-up or reset, the program moves to the main line loop.

The initialization routine also includes direct keyboard or host computer inputs of certain process constants that enable the customization of the system to particular crops.

After initialization the main line of the program is entered. Referring to FIG. 2, the first step in the main line is labeled "sense" and comprises the input of digitized data from all sense zones and preprocessing of the data. (For example, preprocessing may comprise converting wet bulb and dry bulb temperature to vapor pressure deficit. Vapor pressure can be easily calculated from wet to dry bulb temperatures by reference to tables.) The next step, labeled "alarms" is to compare the data to threshold values for which alarms should be activated to call attention to dangerous or potentially catastrophic conditions; for example, loss of heat in the winter months. The next step comprises referring to each control zone and adjusting the controls for that zone. As shown in FIG. 2, the closed-loop controls are first implemented and then the irrigation or misting controls are implemented. When the controls have been implemented in all zones, certain set point driver routines are performed, the physiological age accumulator is updated and the main line is restarted either immediately or following a programmed delay. For a description of the set point drivers reference is made to our above noted patent.

The vapor pressure of water ($P_{wdb}$ at the dry bulb temperature may easily be ascertained from tables stored in memory. Also, the partial pressure of water vapor in air $P_a$) may be easily ascertained from wet bulb and dry bulb temperatures and the psychrometric tables, a portion of which are stored in memory or simply from capacitive humidity transducer data. The tables may yield relative humidity HR for given sets of wet bulb and dry bulb temperatures. The partial pressure ($P_a$) may easily be calculated as $$P_a = \frac{H_R P_w}{100}$$

Vapor pressure deficit ($P_d$) may be calculated as $P_d = P_{wdb} - P_a$.

During times of rapid radiation heating or cooling of the greenhouse, leaf temperature can vary considerably from the ambient air temperature. Hence, according to a preferred embodiment of this invention, the temperature of a surface over the bed which is indicative of leaf temperature is sensed. This may be a grey or dark surface facing the sky. Preferably, the material below the surface is sheet, say 1/16 inch thick plastic or the like. In this way, the temperature of the dark surface will reasonably approximate the temperature at the surface of the leaves of the crop being irrigated or misted. (The leaf surface is not a simple black or dark body since it is cooled by transpiration.) The formula for vapor pressure deficit now becomes $$P_d = P_{wbb} - \frac{H_R P_w}{100}$$

where $P_{wbb}$ equals the vapor pressure of water at the temperature of the surface representative of leaf temperature.

The tables for vapor pressure of water and the psychrometric tables correlating wet bulb and dry bulb temperature to selective humidity are widely available in chemical engineering texts and handbooks.

Figure 3:
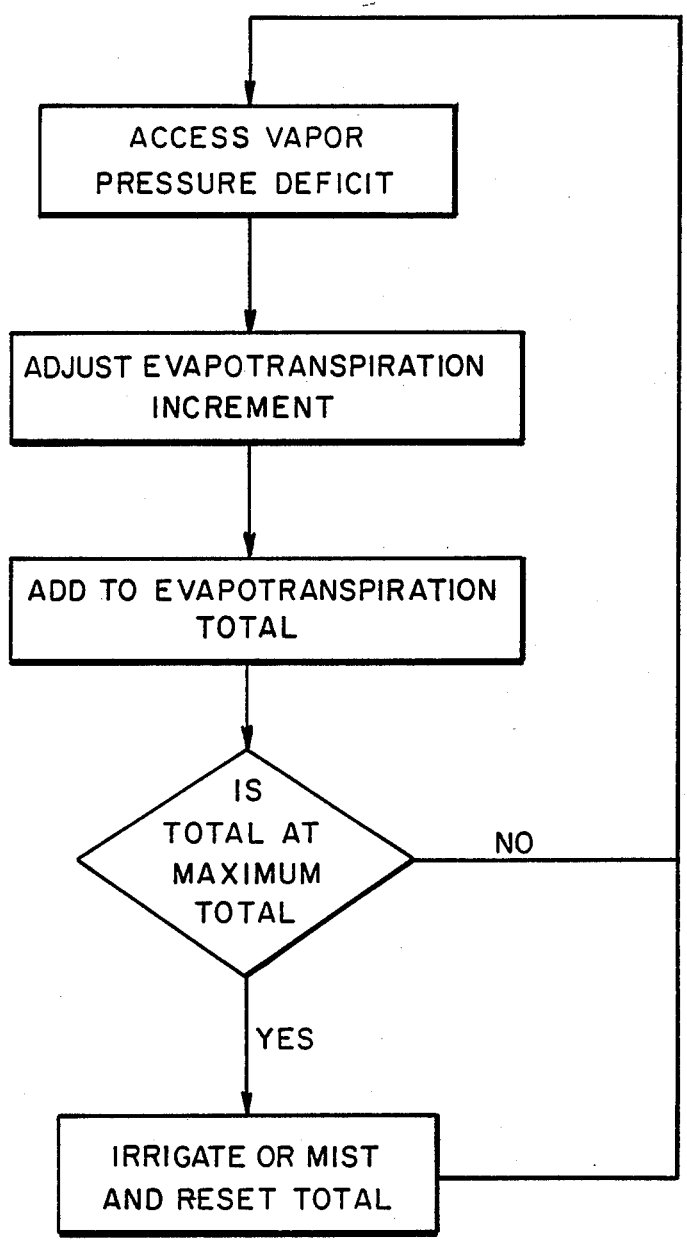
FIG. 3 is a flow chart for a subprogram useful for open-loop control of misting or irrigation.

Referring now to FIG. 3, there is shown a subtask for irrigating or misting. The first step is to access the vapor pressure deficit for the zone in question. This data was input in a previous step and stored in a temporary memory location. The data is used to generate an adjusted evapotranspiration increment which is specific to the crop in the zone being considered and the time between program cycles (the length of time between updates). (In other words, the raw vapor pressure deficit data may be multiplied by factors that account for the time between program cycles and the particular crop. The shorter the time between program cycles, the smaller the factor. The factors must be developed by simple trial and error.) The addition to the total is then made. At this point, the total (accumulated vapor pressure deficit) is compared to the total required for irrigation or misting (referred to as "maximum total"). If the total exceeds maximum total then irrigation is initiated and count is reset to zero. This misting or irrigating applies moisture at intervals throughout the day and into the night. Typically, the duration of the period of the mist or irrigation is fixed and the nozzles are adjustable so that the amount of water applied each time is the same. This is consistent with the established greenhouse practices. Misting takes place until an adequate moisture coating exists over the foliage of the crop. Irrigating takes place until a run-off of from 5 to 20 percent is achieved. Again, the volume of water is controlled by the nozzle setting or throttle setting in the water supply.

The times of misting or irrigating are controlled by vapor pressure deficit and a parameter indicative of leaf area adjusted for the age of the crop (preferably the physiological age, not the chronological age).

The time of the misting is adjusted by adjusting the preselected total ("maximum total") between mistings according to the factor indicative of leaf area and the age of the crop. This can be accomplished in several ways.

Crop age is basically used as a measure of leaf area or to adjust the factor indicative of leaf area as the crop grows. Skilled greenhouse operators can, with a minimum of trial and error, establish the factor indicative of leaf area and therefore the time between misting or irrigating for a given crop at a given age for some typical greenhouse conditions (normal conditions). Thereafter, throughout the day as conditions change within the greenhouse due, for example, to rise and fall of the sun, external temperature and condition, etc., the correct rate of misting or irrigating will be maintained based upon vapor pressure deficit. As the crop ages, the factor indicative of leaf area and therefore the time between misting or irrigating for "normal conditions" can be manually decreased from day to day with satisfactory results. According to a preferred embodiment of this invention, however, the rate of irrigating under "normal conditions" can be automatically adjusted by taking account of the crop age. Even this procedure requires some trial and error by a skilled greenhouse operator to establish the initial value of the factor indicative of leaf area and the rate of change of the factor with crop age.

The crop age may be taken as a chronological age in which case the preselected total accumulated vapor pressure deficit between mistings is adjusted daily. This procedure for increasing the frequency of misting or irrigation with crop age is suitable in some applications; however, the frequency preferably should be adjusted automatically according to the crop's physiological age.

A better measure of the physiological age than chronological age is the accumulated light. Means for accumulating light to establish "light days" involves establishing counting rates based upon "incident light intensity." Photocell output is converted to a counting rate. Counts are then accumulated throughout the day until totalling the number of counts assigned to a "light day". The number of "light days" since planting or initializing the irrigating system and not the number of chronological days is used as a measure of physiological age. The counting and accumulating of light is performed by computer at the time as indicated, for example, on FIG. 2.

It should be understood that the maintenance of the proper mist (in the case of unrooted cuttings) or the proper irrigation (in the case of rooted crops) is necessary to prevent environmental moisture deficiencies. Should there be a deficiency, the growth rate is reduced. It should also be understood that excessive misting or irrigation can result in damage to the crop through leaching. Even a slight excess can result in reduction of the growth rate due to leaching of nutrients from the crop.

As used in the following claims, watering refers to either irrigating or misting.

Having thus described the invention in the detail and particularity required by the Patent Laws, what is desired protected by Letters Patent is set forth in the following claims.

What is claimed:

1. A method for automatically applying water to a crop bed in a greenhouse comprising the steps for:
    (a) continuously at spaced intervals gathering temperature data directly above the bed for estimating the vapor pressure of crop leaf water;
    (b) continuously at spaced intervals gathering data for estimating the vapor pressure of the atmosphere directly above the bed;
    (c) continuously calculating vapor pressure deficit from the data gathered in steps (a) and (b) and accumulating said data;
    (d) establishing a factor indicative of leaf area;
    (e) establishing a vapor pressure deficit accumulation threshold for initiating supply of water based upon the factor established in step (d); and
    (f) when the accumulation determined in step (c) reaches the threshold, supplying water to said crop bed.

2. The method according to claim 1 wherein continuously at spaced intervals dry bulb temperature and humidity are measured in the aspirated housing directly over the bed for estimating the vapor pressure of the atmosphere directly over the bed.

3. The method according to claim 2 wherein continuously at spaced intervals wet bulb and dry bulb temperatures are measured in an aspirated housing directly over the bed for the calculation of the vapor pressure of the atmosphere directly above the bed.

4. The method according to claims 1 or 2 wherein the aspirated dry bulb temperature is used for calculating the estimated vapor pressure of crop leaf water.

5. The method according to claim 1 wherein continuously at spaced intervals dry bulb temperature and humidity are measured in the aspirated housing directly over the bed for estimating the vapor pressure of the atmosphere over the bed and the temperature of an unaspirated surface over the bed is measured for the estimation of the vapor pressure of crop leaf water.

6. The method according to claim 5 wherein the temperature of a dark surface above the bed is sensed and used to estimate the vapor pressure of crop leaf water.

7. The method according to claims 1, 2 or 5 wherein the water supplied to the crop bed in step (f) is supplied in an amount that provides a small amount of runoff.

8. A method according to claims 1, 2 or 5 further comprising measuring a time parameter indicative of physiological crop age for automatically adjusting the factor indicative of leaf area.

9. The method according to claim 8 wherein light intensity directly over the bed is continuously measured at spaced intervals with a photocell and accumulating said data for use as a measure of physiological crop age.

10. A plant oriented automatic method for controlling the environment of a crop bed in a greenhouse comprising the steps for:
    (a) continuously gathering vapor pressure deficit data over the crop bed at spaced time intervals and integrating said data;
    (b) measuring a time parameter indicative of physiological crop age and leaf area;
    (c) closed-loop control of at least one parameter selected from the group temperature, $CO_2$, shade, and ventilation; and
    (d) simultaneous semi-open-loop control of supplying water to the crop bed at intervals which are adjusted according to the integrated vapor pressure deficit data.

11. A method according to claim 10 wherein the strategy for the control in step (a) is to promote growth.

12. The method according to claim 10 wherein the strategy for control in step (b) is to prevent moisture deficiencies.

13. A method according to claim 11 wherein the strategy for programming growth is to increase growth rate and decrease energy usage.

14. A system for controlling environmental conditions including irrigation in greenhouses having a plurality of crop beds within one greenhouse enclosure arranged into a plurality of sense zones and a plurality of control zones comprising:
    (a) a plurality of sensors stationed over crop beds within each sense zone comprising means for generating electrical signals indicative of dry bulb temperature and humidity of the atmosphere and means for generating signals indicative of the temperature of a surface over the bed;
    (b) a computer comprising:

(i) a central processing unit with associated scratch memory, program memory sections and a real time clock;
(ii) an input section for receiving the electrical signals from the sensors;
(iii) an output section for converting the computer logic signals to electrical signals at power levels to operate electromechanical apparatus; and
(iv) means for connecting the central processing unit, input section and output section;

(c) said program memory programmed with:
(i) a task for reading the real time clock;
(ii) a task for inputting data from the input section and for calculating the vapor pressure deficit at each bed;
(iii) a task for establishing times for supply of water based upon the data gathered in (i), and (ii); and
(iv) a task for at the established times initiating electromechanical action for supplying water to the crop bed.

15. A system for controlling environmental conditions including irrigation in greenhouses having a plurality of crop beds within one greenhouse enclosure arranged into a plurality of sense zones and a plurality of control zones comprising:

(a) a plurality of sensors stationed over crop beds within each sense zone comprising an aspirated enclosure and means therein for generating electrical signals indicative of dry bulb temperature and humidity of the atmosphere and means for generating electrical signals indicative of the temperature of a surface over the bed and also means for generating an analog electrical signal indicative of incident light over the bed;

(b) a computer comprising:
(i) a central processing unit with associated scratch memory, program memory sections and a real time clock;
(ii) an input section for receiving the electrical signals from the sensors;
(iii) an output section for converting the computer logic signals to electrical signals at power levels to operate electro-mechanical apparatus; and
(iv) means for connecting the central processing unit, input section and output section;

(c) said program memory programmed with:
(i) a task for reading the real time clock;
(ii) a task for inputting data from the input section for calculating the vapor pressure deficit at each bed;
(iii) a task for inputting data from the input section indicative of light intensity and measuring a time parameter indication of physiological crop age;
(iv) a task for establishing times for supply of water based upon the data gathered in (i), (ii) and (iii); and
(v) a task for at the established times initiating electromechanical action for supplying water to the crop bed.

* * * * *